Patented May 31, 1938

2,119,173

UNITED STATES PATENT OFFICE 2,119,173

SYNTHETIC TANNING AGENT

Paul Müller, Neu-Allschwil, near Basel, Switzerland, assignor to the firm J. R. Geigy A. G., Basel, Switzerland No Drawing. Application December 23, 1935, Serial No. 55,927. In Germany January 12, 1935

10 Claims. (Cl. 149—5)

According to this invention the tanning properties of known synthetic tanning agents can be improved by the addition of inorganic colloids, which need not themselves have tanning properties. Leather prepared with the new tanning agents is distinguished from that prepared with the same synthetic tanning agents alone either by a better feel, a greater strength or, owing to the enhanced tanning value of the agent used, by a reduced cost. Serious disadvantages which have hitherto hindered general application of synthetic tanning agents are thereby to a great extent removed.

As inorganic colloids for use in the invention there are suitable silicon dioxide compounds, that is silicic acid and its sparingly soluble colloidal metal salts, such as the silicates of aluminium, iron, chromium and other metals, the different salts of which are commonly employed as inorganic tanning agents. The colloids may be used singly or in admixture and may, for example, be added to an aqueous solution of the tanning agent in the form of the previously prepared colloid. Generally, however, advantage will be taken of the pronounced action as protective colloids of the tanning agents by producing the colloidal dispersion of the inorganic substance in some suitable phase in the manufacture of the tanning agent; in this manner the production of the new agents is considerably simplified and the stability of the product is ensured to the best advantage. The tanning preparations made in accordance with the invention are not only very stable in the form of concentrated solutions but they can be converted without difficulty, with observation of suitable conditions, like low temperature and reduced pressure, into dry, powdery preparations without unfavourably affecting the colloidal nature of the inorganic constituent.

The following examples illustrate the invention, the parts being by weight:—

Example 1

200 parts of naphthalene sulphonic acid, in the form of the crude sulphonation mixture obtained by heating equal quantities of naphthalene and sulphuric acid monohydrate at 150–160° C. for one hour, are mixed with 100 parts of water, 160 parts of commercial dihydroxydiphenylsulphone and 100 parts of formaldehyde of 30 per cent strength and the whole is heated to boiling in the reflux apparatus for about 1 hour whilst stirring. The reaction mixture is then neutralized in part by means of a mixture of 80 parts of caustic soda solution of 34 per cent strength, 43 parts of commercial water-glass of 38–39° Bé. and 180 parts of water to an acidity suitable for tanning.

By means of this tanning agent there is obtained, according to the usual tanning process, a full and strong leather.

If in the above example, there is added during or after the condensation of the synthetic tanning agent a metal salt with tanning qualities like aluminium-, chromium- or iron-sulphate, a mixture with similar tanning properties is obtained.

Example 2

160 parts of cresol sulphonic acid, obtained from crude cresol by sulphonation with an equal quantity of fuming sulphuric acid containing 26 per cent of anhydride at 100–110° C. within 30 minutes, are slowly diluted with 40 parts of water and, at a temperature of 30–35° C. there are added 50 parts of formaldehyde of 30 per cent strength and the whole is stirred for some time during which the temperature may be allowed to rise to 40° C. The reaction mixture is then neutralized in part by addition of a mixture of 200 parts of water, 43 parts of water-glass of 38–39° Bé. and 80 parts of caustic soda solution of 34.5 per cent strength.

If in the above example, there is added during or after the condensation of the synthetic tanning agent a metal salt with tanning qualities like aluminium-, chromium- or iron-sulphate, a mixture with similar tanning properties is obtained.

Example 3

200 parts of cresol sulphonic acid in the form of the sulphonation mixture obtained as described in Example 2 are diluted at a temperature below 40° C. with 50 parts of water and at an acidity of 10 grams=48 cc. of normal caustic soda solution there are added 40 parts of urea and 120 parts of caustic soda solution of 34.8 per cent strength. There is then quickly added to the reaction mass a mixture of 43 parts of water-glass of 38–39° Bé., 130 parts of formaldehyde of 30 per cent strength and 130 parts of water and the whole is boiled for 10 minutes, allowed to cool and brought to the required acidity by addition of oxalic acid or phosphoric acid (pH 1.5–3).

Example 4

200 parts of cresol sulphonic acid prepared as described above are diluted as described in Example 3 and there are then added in succession and whilst well stirring 60 parts of urea, 114 parts of caustic soda solution of 34.5 per cent strength and 50 parts of powdered aluminium sulphate. The reaction mass thereby becomes spontaneously heated and, at 75° C., there are added 43 parts of water-glass of 38–39° Bé., 200 parts of formaldehyde of 30 per cent strength and 50 parts of water and the whole is heated to boiling for 30 minutes. The product is then brought to an acidity suitable for tanning (pH 1.5–2).

The tanning agent thus prepared, employed as solution or after drying, gives, in remarkable yield, a full and strong leather of good fastness to light.

In this example the aluminium salt may be replaced wholly or in part by another metal salt, such as iron- or chromium salts.

*Example 5*

200 parts of cresol sulphonic acid are prepared as described in Example 2 and mixed after dilution with 60 parts of urea and 114 parts of caustic soda solution of 34.8 per cent strength. At 75° C. there is then run in a mixture of 43 parts of water-glass of 38–39° Bé., 200 parts of formaldehyde of 30 per cent strength and 50 parts of water. The whole is boiled for 10 minutes and there are then added, at 60° C., 20 parts of phosphoric acid of 85 per cent strength and the whole is evaporated under reduced pressure and dried at 60–70° C. The dry tanning agent is finally ground together with 50 parts of crystallized oxalic acid.

An aqueous solution of the product tans hides to a white, full and very tough leather which is fast to light.

If in the above example, there is added during or after the condensation of the synthetic tanning agent a metal salt with tanning qualities like aluminium-, chromium- or iron-sulphate, a mixture with similar tanning properties is obtained.

*Example 6*

50 parts of crude cresol are sulphonated as described in Example 2 and the sulphonation mixture is diluted with water to 125 parts. There are then added 30 parts of urea and, at an acidity of the sulphonic acid of 10 grams=48 cc. of normal caustic soda solution, 57 parts of a caustic soda solution of 34.8 per cent strength. Finally 100 parts of formaldehyde of 30 per cent strength are added and the whole is boiled for 10 minutes. After cooling to 60° C. 20 parts of phosphoric acid of 85 per cent strength are added, the whole is diluted with 550 parts of a colloidal solution of silicic acid of 1 per cent strength, the water is expelled under reduced pressure and the residue is dried at 60–70° C.

*Example 7*

200 parts of naphthalene sulphonic acid in the form of the crude sulphonation mixture obtained as described in Example 1 are mixed with 20 parts of water and at 110° C. 45 parts of formaldehyde of 30 per cent strength are added and the whole is maintained at this temperature whilst stirring until the odour of formaldehyde has disappeared. The reaction mass is then brought to an acidity suitable for use by means of the mixture of alkali and water-glass prescribed in Example 1.

If in the above example, there is added during or after the condensation of the synthetic tanning agent a metal salt with tanning qualities like aluminium-, chromium- or iron-sulphate, a mixture with similar tanning properties is obtained.

The tanning agent so prepared can be dried under reduced pressure without suffering alteration.

Instead of the tanning agents prescribed in the foregoing example there may be used the commercial qualities of any other synthetic tanning agents, such as known under the registered trademarks Ordoval, Tanigan F, DL, DLC, DLN and so on, the synthetic tanning agent either being neutralized in the course of its production by means of an alkaline liquid which yields the required inorganic colloid on acidification or the finished synthetic tanning agent being mixed with the colloid.

What I claim is:—

1. A process for the manufacture of tanning agents, comprising preparing a synthetic tanning agent by condensation in an acid medium and neutralizing with a mixture of water-glass and alkali to an acidity suitable for tanning.

2. A process for the manufacture of tanning agents, comprising preparing a synthetic tanning agent by condensation in an acid medium, adding a metal salt with tanning qualities and neutralizing with a mixture of water-glass and alkali to an acidity suitable for tanning.

3. A process for the manufacture of tanning agents, comprising preparing a synthetic tanning agent by condensation in an acid medium, adding a metal salt with tanning qualities during the condensation of the synthetic tanning agent, and neutralizing with a mixture of water-glass and alkali to an acidity suitable for tanning.

4. A process for the manufacture of tanning agents, comprising preparing a synthetic tanning agent by condensation in an acid medium, adding a metal salt with tanning qualities after the condensation of the synthetic tanning agent being finished, and neutralizing with a mixture of water-glass and alkali to an acidity suitable for tanning.

5. A process for the manufacture of tanning agents, comprising preparing a synthetic tanning agent by condensation in an acid medium, adding as a metal salt with tanning qualities aluminium-sulphate and neutralizing with a mixture of water-glass and alkali to an acidity suitable for tanning.

6. A process for the manufacture of tanning agents, comprising preparing a synthetic tanning agent by condensation in an acid medium, adding as a metal salt with tanning qualities chromium-sulphate and neutralizing with a mixture of water-glass and alkali to an acidity suitable for tanning.

7. A process for the manufacture of tanning agents, comprising preparing a synthetic tanning agent by condensation in an acid medium, adding as a metal salt with tanning qualities ferrisulphate and neutralizing with a mixture of water-glass and alkali to an acidity suitable for tanning.

8. A process for the manufacture of tanning agents, comprising preparing a synthetic tanning agent by condensing naphthalene-sulphonic acid, dihydroxy-diphenylsulphone and formaldehyde in acid medium and neutralizing with a mixture of water-glass and caustic alkali to an acidity suitable for tanning.

9. A process for the manufacture of tanning agents, comprising preparing a synthetic tanning agent by condensing a phenol-sulphonic acid, urea and formaldehyde in acid medium and neutralizing with a mixture of water-glass and caustic alkali to an acidity suitable for tanning.

10. A process for the manufacture of tanning agents, comprising preparing a synthetic tanning agent by condensing a phenol-sulphonic acid, urea and formaldehyde in acid medium, adding as a metal salt with tanning qualities aluminium-sulphate and neutralizing with a mixture of water-glass and caustic alkali to an acidity suitable for tanning.

PAUL MÜLLER.